United States Patent
Chan et al.

(10) Patent No.: US 10,002,240 B2
(45) Date of Patent: Jun. 19, 2018

(54) CONDUCTING A SEQUENCE OF SURVEYS USING A CHALLENGE-RESPONSE TEST

(71) Applicant: International Business Machines Corporation, Armonk, NY (US)

(72) Inventors: Yuk L. Chan, Rochester, NY (US); Michael D. Essenmacher, Danbury, CT (US); James M. Hertzig, Tillson, NY (US); David B. Lection, Raleigh, NC (US); Mark A. Scott

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 14/707,055

(22) Filed: May 8, 2015

(65) Prior Publication Data
US 2016/0328545 A1  Nov. 10, 2016

(51) Int. Cl.
*G06F 7/04* (2006.01)
*G06F 15/16* (2006.01)
*G06F 17/30* (2006.01)
*H04L 29/06* (2006.01)
*G06F 21/31* (2013.01)

(52) U.S. Cl.
CPC .............. *G06F 21/31* (2013.01); *H04L 63/08* (2013.01); *H04L 63/1408* (2013.01); *G06F 2221/2103* (2013.01); *G06F 2221/2133* (2013.01)

(58) Field of Classification Search
CPC . G06F 21/31; G06F 2221/2103; H04L 63/08; H04L 9/3271; H04L 9/3276; G07C 2009/00388

USPC ............................................................ 726/3
See application file for complete search history.

(56) References Cited

U.S. PATENT DOCUMENTS

| | | | | |
|---|---|---|---|---|
| 7,891,005 | B1* | 2/2011 | Baluja | G06F 21/36 713/182 |
| 8,977,847 | B1* | 3/2015 | Juels | H04L 9/3271 713/162 |
| 2004/0221013 | A1* | 11/2004 | Timbadia | H04L 43/00 709/206 |
| 2008/0133347 | A1* | 6/2008 | Josifovski | G06F 17/30864 705/14.44 |
| 2009/0012855 | A1* | 1/2009 | Jamal | G06Q 30/02 705/14.4 |
| 2009/0241201 | A1* | 9/2009 | Wootton | G06F 21/31 726/28 |
| 2009/0328150 | A1* | 12/2009 | Gross | A63F 13/12 726/3 |
| 2011/0113378 | A1* | 5/2011 | Boden | G06F 21/36 715/837 |

(Continued)

*Primary Examiner* — Dant B Shaifer Harriman
(74) *Attorney, Agent, or Firm* — Lance I. Hochhauser; Jose A. Medina-Cruz

(57) ABSTRACT

According to an aspect of the present invention, there is a method, computer program product, and/or system that performs the following steps (not necessarily in the following order): (i) presenting a first challenge-response test to a requestor seeking access to a first application; (ii) receiving a first answer to the first challenge-response test from the requestor; (iii) storing a first test-answer set; and (iv) selecting a subsequent challenge-response test, based at least in part on the first test-answer set. The first test-answer set includes the first answer and a first test indicator. At least the selecting step is performed by computer software running on computer hardware.

20 Claims, 4 Drawing Sheets

(56) References Cited

U.S. PATENT DOCUMENTS

| | | | |
|---|---|---|---|
| 2012/0130802 A1* | 5/2012 | Shimizu | G06Q 30/0245 |
| | | | 705/14.44 |
| 2012/0136678 A1* | 5/2012 | Steinberg | G06Q 50/24 |
| | | | 705/3 |
| 2012/0214442 A1* | 8/2012 | Crawford | H04W 12/06 |
| | | | 455/411 |
| 2012/0246008 A1 | 9/2012 | Hamilton, II et al. | |
| 2012/0246737 A1 | 9/2012 | Paxton et al. | |
| 2012/0254940 A1* | 10/2012 | Raper | G06Q 20/4014 |
| | | | 726/3 |
| 2013/0091027 A1 | 4/2013 | Lin | |
| 2013/0263230 A1* | 10/2013 | Gorodyansky | H04L 63/083 |
| | | | 726/4 |

\* cited by examiner

CONDUCTING A SEQUENCE OF SURVEYS USING A CHALLENGE-RESPONSE TEST

BACKGROUND

The present invention relates generally to the field of information security, and more particularly to access control.

There are a variety of processes of distinguishing computer input from human input, a subset of these processes are challenge-response tests. An example of a challenge-response test is a "completely automated public Turing test to tell computers and humans apart," or CAPTCHA. One use for these challenge-response tests is as feedback-based entrance systems to ensure against the systematic entrance of an automated application to a location, for example, as gatekeepers for email accounts, blog or forum posts, and sensitive websites. Because of the pervasive implementation of these processes, methods and formats have been expanded: from text-based to picture- and video-based; to help digitize books; to show advertisements; and to perform surveys.

SUMMARY

According to an aspect of the present invention, there is a method, computer program product, and/or system that performs the following steps (not necessarily in the following order): (i) presenting a first challenge-response test to a requestor seeking access to a first application; (ii) receiving a first answer to the first challenge-response test from the requestor; (iii) storing a first test-answer set; and (iii) selecting a subsequent challenge-response test, based at least in part on the first test-answer set. The first test-answer set includes the first answer and a first test indicator. At least the selecting step is performed by computer software running on computer hardware.

DETAILED DESCRIPTION

Figure 1:
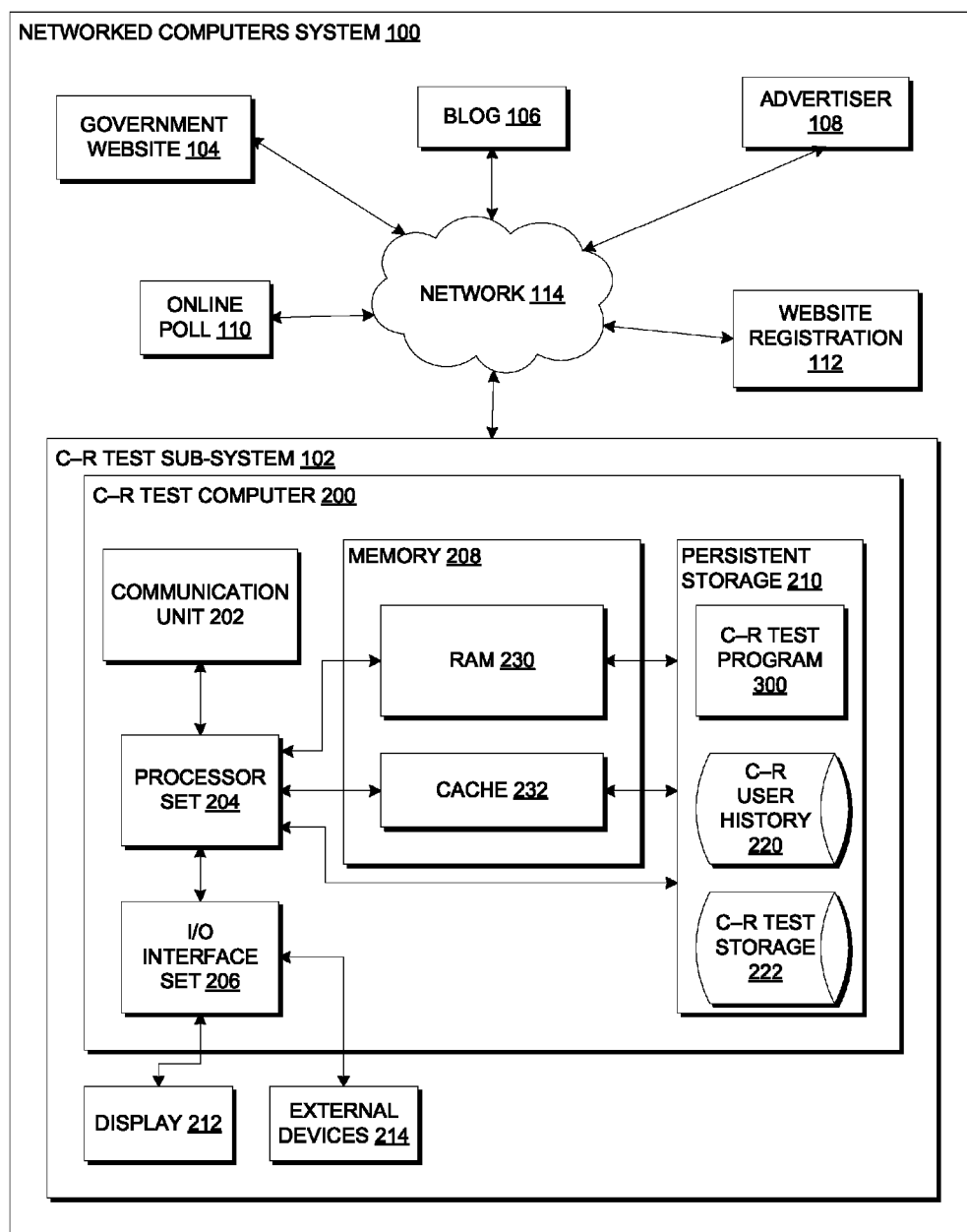
FIG. 1 is a block diagram view of a first embodiment of a system according to the present invention.

Access control using a sequence of challenge-response tests based on prior answers. A subsequent challenge-response tests is selected from a set of related challenge-response tests based on a prior answer received for a prior challenge-response test. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: challenge-response (C-R) test sub-system 102; government website sub-system 104; blog sub-system 106; advertiser sub-system 108; online poll sub-system 110; website registration sub-system 112; communication network 114; challenge-response (C-R) test computer 200; communication unit 202; processor set 204; input/output (I/O) interface set 206; memory 208; persistent storage 210; display device 212; external device set 214; challenge-response (C-R) user history 220; challenge-response (C-R) test storage 222; random access memory (RAM) devices 230; cache memory device 232; and challenge-response (C-R) test program 300.

Challenge-response test sub-system 102 is, in many respects, representative of the various computer sub-system(s) in the present invention. Accordingly, several portions of challenge-response test sub-system 102 will now be discussed in the following paragraphs.

Challenge-response test sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Challenge-response test program 300 is a collection of machine readable instructions and/or data that is used to create, manage and control certain software functions that will be discussed in detail, below, in the Example Embodiment sub-section of this Detailed Description section.

Challenge-response test sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Challenge-response test sub-system 102 is shown as a block diagram with many double arrows. These double arrows (no separate reference numerals) represent a communications fabric, which provides communications between various components of challenge-response test sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for challenge-response test sub-system 102; and/or (ii) devices external to challenge-response test sub-system 102 may be able to provide memory for challenge-response test sub-system 102.

Challenge-response test program 300 is stored in persistent storage 210 for access and/or execution by one or more of the processors in processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Challenge-response test program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to challenge-response test sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with challenge-response test computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, challenge-response test program 300, can be stored on such portable computer-readable storage media. In these embodiments the relevant software may (or may not) be loaded, in whole or in part, onto persistent storage 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
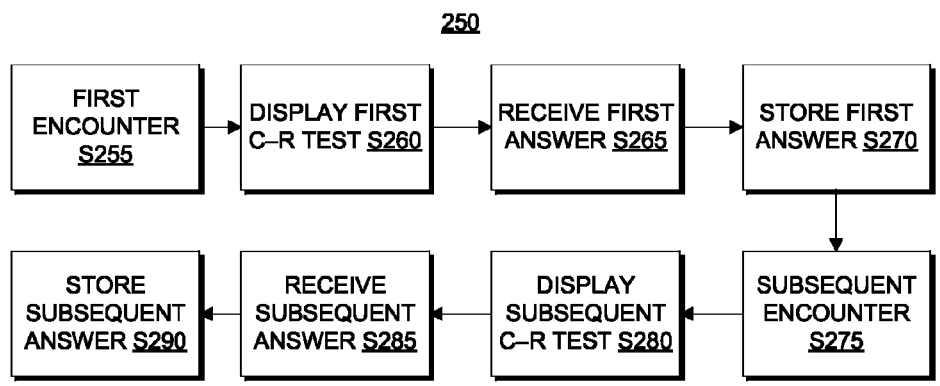
FIG. 2 is a flowchart showing a first embodiment method performed, at least in part, by the first embodiment system.
Figure 3:
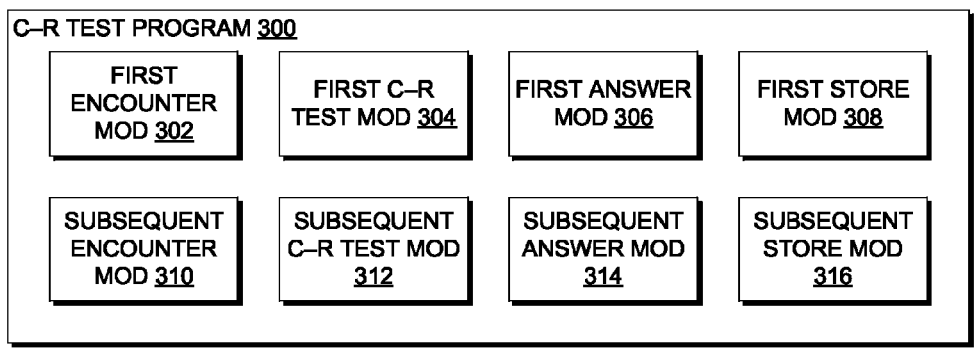
FIG. 3 is a block diagram view of a machine logic (for example, software) portion of the first embodiment system.

FIG. 2 shows flowchart 250 depicting a method according to the present invention. FIG. 3 shows challenge-response test program 300 for performing at least some of the method steps of flowchart 250. This method and associated software will now be discussed, over the course of the following paragraphs, with extensive reference to FIG. 2 (for the method step blocks) and FIG. 3 (for the software blocks). In this example, challenge-response test sub-system 102 (FIG. 1) serves as the interrogator, and a requestor initiates a request for a challenge-response test via, for example, blog sub-system 106 (FIG. 1). The requestor serves as the respondent.

Processing begins at step S255, where first encounter module ("mod") 302 encounters a first request for a challenge-response test. In some embodiments of the present invention, first encounter mod 302 encounters the first request from the requestor directly. Alternatively, the first request is encountered from the requestor indirectly, through a service provider, including, but not limited to: (i) a website; (ii) a blog; (iii) an advertiser; (iv) an online poll; (v) a website registration; (vi) an application user interface; and/or (vii) a mobile application. For example, the service provider may be online poll sub-system 110. In some embodiments of the present invention, a set of information about the requestor is collected. This first set of requestor information may include, but is not limited to: (i) a media access control (MAC) address; (ii) an Internet Protocol (IP) address; (iii) a user agent; (iv) a browser session agent; (v) a set of biometric information; (vi) a unique device identifier (UDID); (vii) a cellular telephone number; (viii) an international mobile station equipment identity (IMEI); and/or (ix) a registered user identification on a third-party system (e.g., a username or a set of login information). In some of these embodiments, the first set of requestor information is used to uniquely identify the requestor. In some embodiments of the present invention, the first set of requestor information is stored in challenge-response user history 220 (FIG. 1). Alternatively, the first set of requestor information is not stored in a specified location within persistent storage 210.

Processing proceeds to step S260, where first challenge-response test mod 304 presents a first challenge-response test to the requestor. In some embodiments of the present invention, first challenge-response test mod 304 presents the first challenge-response test to the requestor directly. Alternatively, first challenge-response test mod 304 presents the first challenge-response test to the requestor indirectly, through a service provider. In some embodiments of the present invention, the first request is encountered from the requestor directly, and the first challenge-response test is presented to the requestor indirectly. Alternatively, the first request is encountered from the requestor indirectly, and the first challenge-response test is presented to the requestor directly. Alternatively, the first request is encountered from the requestor indirectly, through a first service provider, and the first challenge-response test is presented to the requestor indirectly, through a second service provider. In some embodiments of the present invention, the first challenge-response test is selected by challenge-response test sub-system from a set of challenge-response tests.

In some embodiments of the present invention, a subset of challenge-response tests within the set of challenge-response tests are organized and related to one another. In these embodiments, the organization or relation among the subset of challenge-response tests may include, but is not limited to: (i) a flowchart; (ii) a decision tree; and/or (iii) a decision table. In some embodiments of the present invention, the first challenge-response test is presented in a visual format. Alternatively, the first challenge-response test is presented in a format, including: (i) video; (ii) audio; and/or (iii) tactile. In some embodiments of the present invention, the first challenge-response test includes a single question for the requestor. Alternatively, the first challenge-response test includes a plurality of questions for the requestor. In some embodiments of the present invention, the first set of requestor information is collected and/or stored during step S260, instead of during step S255.

Processing proceeds to step S265, where first answer mod 306 receives a first answer from the requestor. In some embodiments of the present invention, first answer mod 306 receives the first answer from the requestor directly. Alternatively, first answer mod 306 receives the first answer from the requestor indirectly, through a service provider. In some embodiments of the present invention, the first challenge-response test is presented to the requestor directly, and the first answer is received from the requestor indirectly. Alternatively, the first challenge-response test is presented to the requestor indirectly, and the first answer is received from the requestor directly. Alternatively, the first challenge-response test is presented to the requestor indirectly, through a first service provider, and the first answer is received from the requestor indirectly, through a second service provider. In some embodiments of the present invention, the first answer includes a single response to the first challenge-response test. Alternatively, the first answer includes a plurality of responses to the first challenge-response test. In some embodiments of the present invention, the first answer includes the same number of responses as the number of questions included in the first challenge-response test. Alternatively, the first answer includes a different number of responses from the number of questions included in the first challenge-response test.

In some embodiments of the present invention, first answer mod 306 analyzes the first answer to determine if the requestor is human. In some embodiments of the present invention, if first answer mod 306 determines the requestor to be human, the requestor is permitted access to a service provider, such as online poll sub-system 110. In some embodiments of the present invention, the first answer is received in a visual format. Alternatively, the first answer is received in a format, including, but not limited to: (i) video; (ii) audio; and/or (iii) tactile. In some embodiments of the present invention, the first answer is received in the same format as the format in which the first challenge-response test is presented. Alternatively, the first answer is received in a different format from the format in which the first challenge-response test is presented. Alternatively, a subset of the formats in which the first answer is received is a subset of the formats in which the first challenge-response test is presented. In some embodiments of the present invention, the first answer is associated with a profile related to the requestor. In some embodiments of the present invention, the first set of requestor information is collected and/or stored during step S265, instead of during step S255.

Processing proceeds to step S270, where first store mod 308 stores the first answer. In some embodiments of the present invention, the first answer is stored in challenge-response user history 220 (FIG. 1). Alternatively, the first set of requestor information is not stored in a specific location within challenge-response test sub-system 102. In some embodiments of the present invention, the first answer is stored in a first test-answer set. In some embodiments of the present invention, the first test answer set includes a first test indicator. In some embodiments of the present invention, the first test indicator is a number that corresponds to the first challenge-response test. Alternatively, the first test indicator is the first challenge-response test. In some embodiments of the present invention, the first set of requestor information is collected and/or stored during step S270, instead of during step S255. In some embodiments of the present invention, the first answer is stored in a manner such that it is associated with the first set of requestor information. In some embodiments of the present invention, the format of the first answer is converted into a different format before it is stored. For example, an answer "yes" is converted to a tuple in which the positive response is associated with a subject of the challenge-response test and a timestamp. In some embodiments of the present invention, the first challenge-response test is also stored with the first answer. Alternatively, a link to the first challenge-response test is stored and/or a reference to the first challenge-response test is stored. In some embodiments of the present invention, the subset of challenge-response tests, a link to the subset of challenge-response tests, and/or a reference to the subset of challenge-response tests is stored with the first answer. In some embodiments of the present invention, the first set of requestor information, the first challenge-response test, and/ or the first answer are stored to a remote server.

Processing proceeds to step S275, where subsequent encounter mod 310 encounters a subsequent request for a challenge-response test. In some embodiments of the present invention, subsequent encounter mod 310 encounters the subsequent request from the requestor directly. Alternatively, the subsequent request is encountered from the requestor indirectly, through a service provider. In some embodiments of the present invention, the first request is encountered from the requestor directly, and the subsequent request is encountered from the requestor indirectly. Alternatively, the first request is encountered from the requestor indirectly, and the subsequent request is encountered from the requestor directly. Alternatively, the first request is encountered from the requestor indirectly, through a first service provider, and the subsequent request is encountered from the requestor indirectly, through a second service provider. In some embodiments of the present invention, a subsequent set of requestor information is collected. In some embodiments of the present invention, subsequent encounter mod 310 determines if the requestor of the subsequent request is the same as the requestor for the first request. In some of these embodiments, the subsequent set of requestor information is compared to the first set of requestor information to make the determination of whether the requestor of the subsequent request is the same as the requestor for the first request.

In some embodiments of the present invention, the subsequent set of requestor information is stored in challenge-response user history 220. Alternatively, the subsequent set of requestor information is not stored in a specific location within challenge-response test sub-system 102. In some embodiments of the present invention, the subsequent set of requestor information is stored in the same location as the location in which the first set of requestor information is stored. Alternatively, the subsequent set of requestor information is stored in a different location from the location in which the first set of requestor information is stored. In some embodiments of the present invention, a subset of the subsequent set of requestor information is combined with the first set of requestor information to more uniquely identify the requestor. In some embodiments of the present invention, the subsequent set of requestor information is not stored. In some embodiments of the present invention, subsequent encounter mod 310 encounters the subsequent request from the requestor on a different hardware from the hardware on which the challenge-response test sub-system 102 encountered the first request.

Processing proceeds to step S280, where subsequent challenge-response test mod 312 presents a subsequent challenge-response test to the requestor. In some embodiments of the present invention, subsequent challenge-response test mod 312 presents the subsequent challenge-response test to the requestor directly. Alternatively, challenge-response test sub-system 102 presents the subsequent challenge-response test to the requestor indirectly, through a service provider. In some embodiments of the present invention, the subsequent request is encountered from the requestor directly, and the subsequent challenge-response test is presented to the requestor indirectly. Alternatively, the subsequent request is encountered from the requestor indirectly, and the subsequent challenge-response test is presented to the requestor directly. Alternatively, the subsequent request is encountered from the requestor indirectly, through a subsequent service provider, and the subsequent challenge-response test is presented to the requestor indirectly, through a second service provider.

In some embodiments of the present invention, the subsequent challenge-response test is selected by subsequent challenge-response test mod 312 from a set of challenge-response tests. In some embodiments of the present invention, a subset of challenge-response tests within the set of challenge-response tests are organized and related. In these embodiments, the organization or relation among the subset of challenge-response tests may include, but is not limited to: (i) a flowchart; (ii) a decision tree; and/or (iii) a decision table. In some embodiments of the present invention, the subsequent challenge-response test is selected from the subset of challenge-response tests within the set of challenge-response tests from which the first challenge-response test is selected. In some embodiments of the present invention, the subsequent challenge-response test is selected from the subset of challenge-response tests based on the first answer. Alternatively, the subsequent challenge-response test is selected from the subset of challenge-response tests based on information stored in challenge-response user history 220. Alternatively, the subsequent challenge-response test is selected from the subset of challenge-response tests based on information stored in a variety of locations within challenge-response test sub-system 102.

In some embodiments of the present invention, the subsequent challenge-response test is presented in a visual format. Alternatively, the subsequent challenge-response test is presented in a format, including: (i) video; (ii) audio; and/or (iii) tactile. In some embodiments of the present invention, the subsequent challenge-response test is presented in the same format as the format in which the first challenge-response test is presented. Alternatively, the subsequent challenge-response test is presented in a different format from the format in which the first challenge-response test is presented. Alternatively, a subset of the formats in which the subsequent challenge-response test is presented is a subset of the formats in which the first challenge-response test is presented. In some embodiments of the present invention, the subsequent challenge-response test includes a single question for the requestor. Alternatively, the subsequent challenge-response test includes a plurality of questions for the requestor. In some embodiments of the present invention, the subsequent set of requestor information is stored during step S280, instead of during step S275. In some embodiments of the present invention, the term "subsequent" indicates a second instance of an occurrence. Alternatively, the term "subsequent" means any instance of an occurrence other than a first instance of an occurrence. In some embodiments of the present invention, during a "subsequent" instance of an occurrence, references to a "first" instance of an occurrence also include prior "subsequent" instances of an occurrence. For example: a "subsequent" challenge-response test is selected from the subset of challenge-response tests based on the "first" answer. Here, the "first" answer may include the first answer and a set of prior "subsequent" answers.

Processing proceeds to step S285, where subsequent answer mod 314 receives a subsequent answer from the requestor. In some embodiments of the present invention, subsequent answer mod 314 receives the subsequent answer from the requestor directly. Alternatively, subsequent answer mod 314 receives the subsequent answer from the requestor indirectly, through a service provider. In some embodiments of the present invention, the subsequent challenge-response test is presented to the requestor directly, and the subsequent answer is received from the requestor indirectly. Alternatively, the subsequent challenge-response test is presented to the requestor indirectly, and the subsequent answer is received from the requestor directly. Alternatively, the subsequent challenge-response test is presented to the requestor indirectly, through a subsequent service provider, and the subsequent answer is received from the requestor indirectly, through a second service provider. In some embodiments of the present invention, the subsequent answer includes a single response to the subsequent challenge-response test. Alternatively, the subsequent answer includes a plurality of responses to the subsequent challenge-response test. In some embodiments of the present invention, the subsequent answer includes the same number of responses as the number of questions included in the subsequent challenge-response test. Alternatively, the subsequent answer includes a different number of responses from the number of questions included in the subsequent challenge-response test.

In some embodiments of the present invention, subsequent answer mod 314 analyzes the subsequent answer to determine if the requestor is human. In some embodiments of the present invention, if challenge-response test sub-system determines the requestor to be human, the requestor is permitted access to a service provider, such as online poll sub-system 110. In some embodiments of the present invention, the subsequent answer is received in a visual format. Alternatively, the subsequent answer is received in a format, including, but not limited to: (i) video; (ii) audio; and/or (iii) tactile. In some embodiments of the present invention, the subsequent answer is received in the same format as the format in which the subsequent challenge-response test is presented. Alternatively, the subsequent answer is received in a different format from the format in which the subsequent challenge-response test is presented. Alternatively, a subset of the formats in which the subsequent answer is received is a subset of the formats in which the subsequent challenge-response test is presented. In some embodiments of the present invention, the subsequent set of requestor information is stored during step S285, instead of during step S275.

Processing proceeds to step S290, where subsequent store mod 316 stores the subsequent answer. In some embodiments of the present invention, the subsequent answer is stored in challenge-response user history 220. Alternatively, the subsequent set of requestor information is not stored in a specific location within challenge-response test sub-system 102. In some embodiments of the present invention, the subsequent answer is stored in a subsequent test-answer set. In some embodiments of the present invention, the subsequent answer is stored in the same location as the location in which the first answer is stored. Alternatively, the subsequent answer is stored in a different location from the location in which the first answer is stored. In some embodiments of the present invention, the subsequent answer is stored in a manner such that it is associated with the first set of requestor information. In some embodiments of the present invention, the format of the subsequent answer is converted into a different format before it is stored. In some embodiments of the present invention, the subsequent challenge-response tests is also stored with the subsequent answer. Alternatively, a link to the subsequent challenge-response test is stored and/or a reference to the subsequent challenge-response test is stored. In some embodiments of the present invention, the subset of challenge-response tests, a link to the subset of challenge-response tests, and/or a reference to the subset of challenge-response tests is stored with the subsequent answer. In some embodiments of the present invention, the subsequent set of requestor information is stored during step S280, instead of during step S275. In some embodiments of the present invention, the subsequent set of requestor information, the subsequent challenge-response test, and/or the subsequent answer are stored to a remote server.

III. Further Comments and/or Embodiments

Some embodiments of the present invention recognize the following facts, potential problems, and/or potential areas for improvement with respect to the current state of the art: (i) challenge-response tests are used as one-time vehicles; and/or (ii) challenge-response tests are used for surveys.

Figure 4:
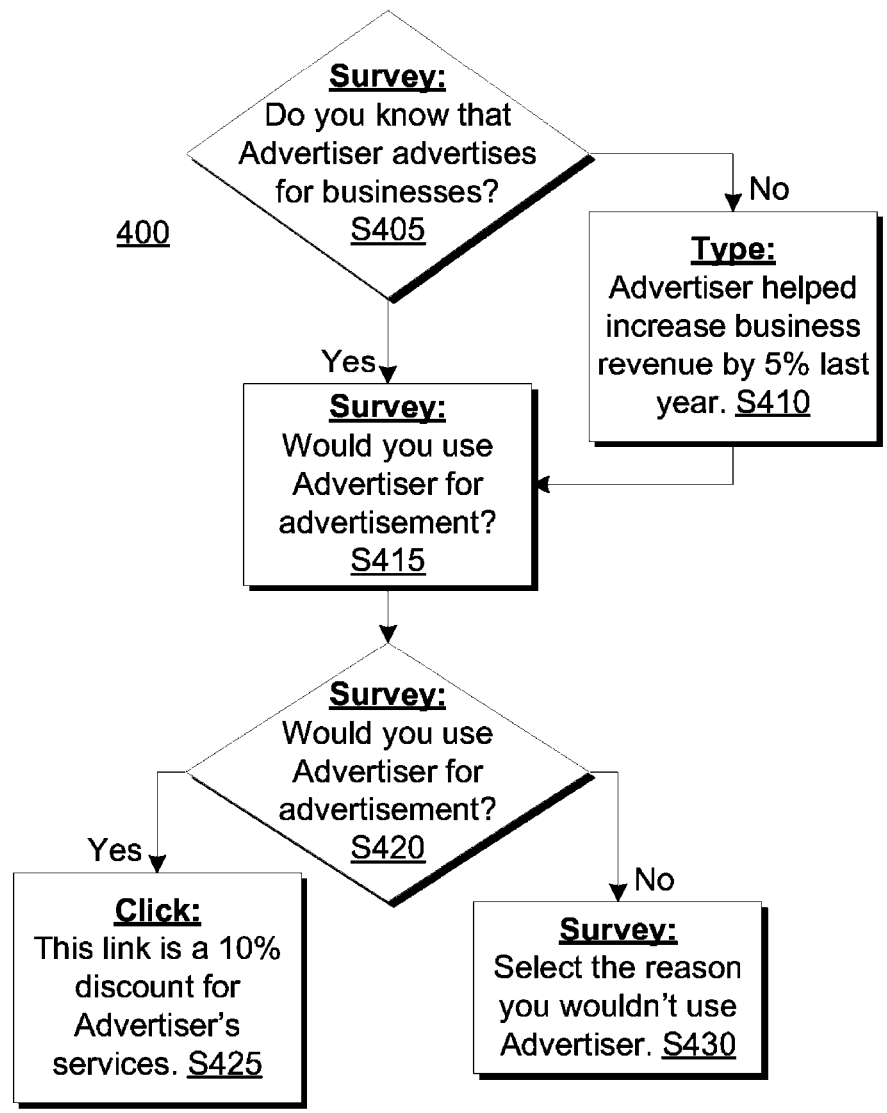
FIG. 4 is a flowchart showing a second embodiment method performed, at least in part, by a second embodiment system according to the present invention.

FIG. 4 shows flowchart 400 depicting a method according to the present invention. To better understand flowchart 400, an example will be referred to throughout the description. In this example, a challenge-response test sub-system encounters a sequence of requests from the same requestor.

Processing begins at decision step S405, where a challenge-response test sub-system encounters a first request for a challenge-response test and decides whether the response is a positive response or a negative response. In this example, a first challenge-response test is selected from a subset of challenge-response tests within a set of challenge-response tests that are related. In some embodiments of the present invention, advertisers submit a subset of challenge-response tests to a challenge-response test sub-system. In this example, the first challenge-response test presented is a "survey," asking the requestor a question. If the challenge-response test sub-system receives an answer indicating a positive response, processing proceeds through the "Yes" branch to step S415. If the challenge-response test sub-system receives an answer indicating a negative response, processing proceeds through the "No" branch. In some embodiments of the present invention, a "survey" challenge-response test is used to gain information about the requestor. In some embodiments of the present invention, the challenge-response test sub-system transmits the answer received from the requestor to the advertiser. In some embodiments of the present invention, a set of answers received from the requestor are not transmitted to the advertiser until the requestor completes the subset of challenge-response tests. In some embodiments of the present invention, the challenge-response test sub-system transmits only a subset of the set of answers received from the requestor.

Following the "No" branch from step S405, processing proceeds to step S410, where the challenge-response test sub-system encounters a subsequent request for a challenge-response test. In this example, the subsequent challenge-response test presented is a "type," requiring the requestor to repeat back a given set of text. In some embodiments of the present invention, a "type" challenge-response test is used to give the requestor information about the advertiser.

Either from the "Yes" branch of step S405 or from step S410, processing proceeds to step S415, where the challenge-response test sub-system encounters a subsequent request for a challenge-response test. In this example, the challenge-response test sub-system has received a set of prior requests for challenge-response tests. A subsequent request for a challenge-response test may be a second request or may be any other request after a first request.

Processing proceeds to decision step S420, where the challenge-response test sub-system encounters a second subsequent request for a challenge-response test and decides whether the response is a positive response or a negative response. In some embodiments of the present invention, the second subsequent request is a third request or is any other request after a second request. In this example, the challenge-response test sub-system presents an identical challenge-response test to the test presented in step S415. In some embodiments of the present invention, a challenge-response test is repeated to confirm information received in a prior challenge-response test. In some embodiments of the present invention, the repetition of a challenge-response test is used to determine the reliability of a requestor. In some embodiments of the present invention, if a challenge-response test sub-system receives different answers to a repeated challenge-response test from the same requestor, the requestor is deemed not reliable. In some embodiments of the present invention, if a challenge-response test sub-system receives different answers to a repeated challenge-response test from the same requestor, the subset of challenge-response tests is completed. If the challenge-response test sub-system receives an answer indicating a positive response, processing proceeds through the "Yes" branch. If the challenge-response test sub-system receives an answer indicating a negative response, processing proceeds through the "No" branch.

Following the "Yes" branch from step S420, processing terminates at step S425, where challenge-response test sub-system encounters a subsequent request for a challenge-response test. In this example, the challenge-response test sub-system presents a "click" challenge-response test, requiring a requestor to click on a link. These formats of challenge-response tests ("survey," "type," and "click") are not an exhaustive list of formats for challenge-response tests, but an example of visual or text challenge-response tests. The variety of other formats is extensive, and includes, but is not limited to: (i) audio response; (ii) drag-and-drop; and/or (iii) trace. In some embodiments of the present invention, the advertiser increases potential business by directing a requestor to a website operated by the advertiser. Alternatively, the advertiser presents the requestor with a special deals for goods and/or services. In some embodiments of the present invention, the advertiser is limited in the number of challenge-response tests included in the subset of challenge-response tests.

Following the "No" branch from step S420, processing terminates at step S430, where challenge-response test sub-system encounters a subsequent request for a challenge-response test. In some embodiments of the present invention, the advertiser collects additional information about why a requestor does not use or like the goods or services offered by the advertiser.

Figure 5:
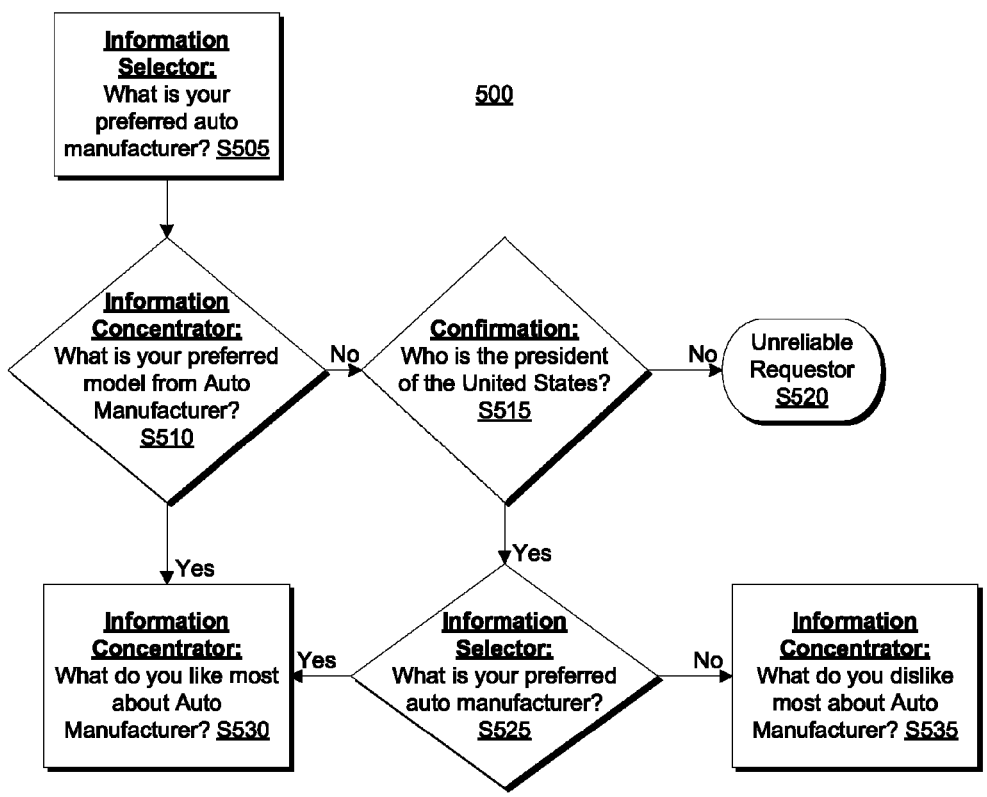
FIG. 5 is a flowchart showing a third embodiment method performed, at least in part, by a third embodiment system according to the present invention.

FIG. 5 shows flowchart 500 depicting a method according to the present invention. To better understand flowchart 500, an example will be referred to throughout the description. In this example, a challenge-response test sub-system encounters a sequence of requests from the same requestor and the challenge-response tests are from a set of related challenge-response tests submitted by Auto Manufacturer, an auto manufacturer doing market research.

Processing begins at step S505, where a challenge-response test sub-system encounters a first request for a challenge-response test and presents an "information selector" type challenge-response test. In this example, an information selector type challenge-response test presents a set of choices from which the requestor can select an answer. In this example, the first challenge-response test is used by Auto Manufacturer to gauge general interest in its products. Requestors that respond with "Auto Manufacturer" continue with the series of related challenge-response tests.

Processing proceeds to decision step S510, where the challenge-response test sub-system encounters a second (first subsequent) request for a challenge-response test, presents an "information concentrator" type challenge-response test, and decides the reliability of a requestor. In this example, Auto Manufacturer seeks to determine the relative popularity of its different model lines. If the challenge-response test sub-system receives an answer indicating a model not made by Auto Manufacturer or an unpopular model made by Auto Manufacturer, processing proceeds through the "No" branch to step S515. If the challenge-response test sub-system receives an answer indicating one of the more popular models made by Auto Manufacturer, processing proceeds through the "Yes" branch to step S530.

Following the "No" branch from step S510, processing proceeds to decision step S515, where the challenge-response test sub-system encounters another subsequent request for a challenge-response test, presents an "confirmation" type challenge-response test, and decides the reliability of a requestor. In this example, the responses provided by the requestor followed branches of a decision tree indicating to Auto Manufacturer that the requestor may not be reliable. Therefore, the "confirmation" type challenge-response test is presented to the requestor to make a final decision on the reliability of the requestor. In this example, the challenge-response test prompts the requestor for the name of the current president of the United States. If the challenge-response test sub-system receives an answer other than the then-current president of the United States, processing proceeds through the "No" branch to termination step S520, where, the requestor is deemed unreliable and suitable only for advertisements from Auto Manufacturer. If the challenge-response test sub-system receives an answer properly naming the then-current president of the United States, processing proceeds through the "Yes" branch to step S525.

Following the "Yes" branch from step S515, processing proceeds to decision step S525, where the challenge-response test sub-system encounters another subsequent request for a challenge-response test, presents an "information selector" type challenge-response test, and decides whether the requestor prefers Auto Manufacturer as an auto manufacturer. In this challenge-response test, Auto Manufacturer is repeating the first challenge-response test presented to the requestor due to prior questions of the reliability of the requestor. If the challenge-response test sub-system receives an answer indicating Auto Manufacturer is the preferred auto manufacturer of the requestor, processing proceeds through the "Yes" branch to step S530. If the challenge-response test sub-system receives an answer indicating any other auto manufacturer, processing proceeds through the "No" branch to step S535.

Following the "Yes" branch from either step S510 or S525, processing terminates at step S530, where the challenge-response test sub-system encounters another subsequent request for a challenge-response test and presents an "information concentrator" type challenge-response test. With this challenge-response test, Auto Manufacturer gathers information about the positive qualities the requestor associates with Auto Manufacturer.

Following the "No" branch from step S525, processing terminates at step S535, where the challenge-response test sub-system encounters another subsequent request for a challenge-response test and presents an "information concentrator" type challenge-response test. With this challenge-response test, Auto Manufacturer gathers information about the negative qualities the requestor associates with Auto Manufacturer.

Some embodiments of the present invention may include one, or more, of the following features, characteristics, and/or advantages: (i) determining the content of a subsequent challenge-response test based on a set of answers to a set of prior challenge-response tests; (ii) displaying an advertisement as a challenge-response test based on a set of answers to a set of prior challenge-response tests; (iii) offering a subsequent challenge-response test based on a set of user specific factors; (iv) for each user, remembering a set of answers to a set of prior challenge-response tests to increase survey accuracy; (v) allowing an advertiser to create a set of challenge-response tests in a flowchart sequence and/or a decision tree sequence based on a set of responses to the set of challenge-response tests; (vi) creating a database of users that have encountered a challenge-response test; (vii) increasing the advertising value of challenge-response tests by targeting advertisements to a user; (viii) allowing a provider of a set of challenge-response tests to get more detailed answers to challenge-response tests, to educate a user based on a set of responses to a set of prior challenge-response tests, and to confirm the reliability of a user responding to challenge-response tests; and/or (ix) making challenge-response tests more robust.

Some embodiments of the present invention may include one, or more, of the following features, characteristics, and/or advantages: (i) using a subsequent challenge-response tests to clarify a set of answer to a set of prior challenge-response tests; (ii) using a subsequent challenge-response test to confirm a set of answers to a set of prior challenge-response test; (iii) using a subsequent challenge-response test to increase the accuracy of a set of answers to a set of prior challenge-response tests; and/or (iv) using a subsequent challenge-response test to confirm the validity of a set of answers to a set of prior challenge-response tests.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including, but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions, and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Challenge-response test: any computer-based interrogative process requiring an answer from a respondent, wherein an interrogator determines whether the respondent is human based on the answer provided by the respondent.

What is claimed is:

1. A method comprising:
   determining a first encounter with a first requestor;
   presenting a first challenge-response test to the first requestor seeking access to a first application, wherein the first challenge-response test has a first format, wherein the first format is selected from the group consisting of: (i) video, (ii) audio, and (iii) tactile;
   receiving a first answer to the first challenge-response test from the first requestor;
   receiving a first set of requestor information from the first requestor;
   determining a subsequent encounter with a second requestor;
   receiving a subsequent set of requestor information from the second requestor;
   determining whether the first requestor is the same as the second requestor by comparison of the first set of requestor information with the subsequent set of requestor information; and
   responsive to determining the first requestor is the same as the second requestor, selecting, responsive to a subsequent encounter, a subsequent challenge-response test, based at least in part on a first test-answer set and a decision tree, wherein:
      the subsequent challenge-response test has a second format,
      the second format is different from the first format,
      the first test-answer set includes the first answer and a first test indicator, and
      the decision tree includes, at least, the first challenge-response test and the subsequent challenge-response test;
   wherein:
      at least the selecting step is performed by computer software running on computer hardware.

2. The method of claim 1, wherein the subsequent challenge-response test is selected from a set of related challenge-response tests, wherein the first set of requestor information and the subsequent set of requestor information are selected from the group consisting of: (i) a media access control (MAC) address; (ii) an Internet Protocol (IP) address; (iii) a user agent; (iv) a browser session agent; (v) a set of biometric information; (vi) a unique device identifier (UDID); (vii) a cellular telephone number; (viii) an international mobile station equipment identity (IMEI); and (ix) a registered user identification on a third-party system (e.g., a username or a set of login information).

3. The method of claim 1, wherein the subsequent challenge-response test is not a second challenge-response test.

4. The method of claim 1, further comprising:
   presenting the subsequent challenge-response test to a third requestor seeking access to a second application; and
   receiving a subsequent answer to the subsequent challenge-response test from the third requestor.

5. The method of claim 4, further comprising:
   storing a first test-answer set; and
   storing a subsequent test-answer set;
   wherein:
      the first test-answer set and the subsequent test-answer set are stored on a remote server.

6. The method of claim 1, further comprising:
   associating the first test-answer set with a profile, corresponding to the first requestor, stored to a memory.

7. The method of claim 1, wherein at least one of the first challenge-response test or the subsequent challenge-response test is a completely automated public Turing test to tell computers and humans apart (CAPTCHA).

8. The method of claim 1, wherein the first test indicator is the first challenge-response test.

9. A computer program product comprising a computer readable storage medium having stored thereon:
   program instructions programmed to determine a first encounter with a first requestor;
   program instructions programmed to present a first challenge-response test to the first requestor seeking access to a first application, wherein the first challenge-response test has a first format, wherein the first format is selected from the group consisting of: (i) video, (ii) audio, and (iii) tactile;
   program instructions programmed to receive a first answer to the first challenge-response test from the first requestor;
   program instructions programmed to receive a first set of requestor information from the first requestor;
   program instructions programmed to determine a subsequent encounter with a second requestor;

program instructions programmed to receive a subsequent set of requestor information from the second requestor;

program instructions programmed to determine whether the first requestor is the same as the second requestor by comparison of the first set of requestor information with the subsequent set of requestor information; and program instructions programmed to select, responsive to determining the first requestor is the same as the second requestor, a subsequent challenge-response test, based at least in part on a first test-answer set and a decision tree, wherein:

the subsequent challenge-response test has a second format, the second format is different from the first format, the first test-answer set includes the first answer and a first test indicator, and the decision tree includes, at least, the first challenge-response test and the subsequent challenge-response test.

10. The computer program product of claim 9, wherein the subsequent challenge-response test is selected from a set of related challenge-response tests, wherein the first set of requestor information and the subsequent set of requestor information are selected from the group consisting of: (i) a media access control (MAC) address; (ii) an Internet Protocol (IP) address; (iii) a user agent; (iv) a browser session agent; (v) a set of biometric information; (vi) a unique device identifier (UDID); (vii) a cellular telephone number; (viii) an international mobile station equipment identity (IMEI); and (ix) a registered user identification on a third-party system (e.g., a username or a set of login information).

11. The computer program product of claim 9, wherein the subsequent challenge-response test is not a second challenge-response test.

12. The computer program product of claim 9, further comprising:

program instructions programmed to present the subsequent challenge-response test to a third requestor seeking access to a second application; and program instructions programmed to receive a subsequent answer to the subsequent challenge-response test from the third requestor.

13. The computer program product of claim 9, wherein at least one of the first challenge-response test or the subsequent challenge-response test is a completely automated public Turing test to tell computers and humans apart (CAPTCHA).

14. The computer program product of claim 9, wherein the first test indicator is the first challenge-response test.

15. A computer system comprising:

a processor set; and a computer readable storage medium;

wherein:

the processor set is structured, located, connected, and/or programmed to run program instructions stored on the computer readable storage medium; and the program instructions include:

program instructions programmed to determine a first encounter with a first requestor;

program instructions programmed to present a first challenge-response test to the first requestor seeking access to a first application, wherein the first challenge-response test has a first format, wherein the first format is selected from the group consisting of: (i) video, (ii) audio, and (iii) tactile;

program instructions programmed to receive a first answer to the first challenge-response test from the first requestor;

program instructions programmed to receive a first set of requestor information from the first requestor;

program instructions programmed to determine a subsequent encounter with a second requestor;

program instructions programmed to receive a subsequent set of requestor information from the second requestor;

program instructions programmed to determine whether the first requestor is the same as the second requestor by comparison of the first set of requestor information with the subsequent set of requestor information; and program instructions programmed to select, responsive to a determining the first requestor is the same as the second requestor, a subsequent challenge-response test, based at least in part on a first test-answer set and a decision tree, wherein:

the subsequent challenge-response test has a second format, the second format is different from the first format, the first test-answer set includes the first answer and a first test indicator, and the decision tree includes, at least, the first challenge-response test and the subsequent challenge-response test.

16. The computer system of claim 15, wherein the subsequent challenge-response test is selected from a set of related challenge-response tests, wherein the first set of requestor information and the subsequent set of requestor information are selected from the group consisting of: (i) a media access control (MAC) address; (ii) an Internet Protocol (IP) address; (iii) a user agent; (iv) a browser session agent; (v) a set of biometric information; (vi) a unique device identifier (UDID); (vii) a cellular telephone number; (viii) an international mobile station equipment identity (IMEI); and (ix) a registered user identification on a third-party system (e.g., a username or a set of login information).

17. The computer system of claim 15, wherein the subsequent challenge-response test is not a second challenge-response test.

18. The computer system of claim 15, further comprising:

program instructions programmed to present the subsequent challenge-response test to a third requestor seeking access to a second application; and program instructions programmed to receive a subsequent answer to the subsequent challenge-response test from the third requestor.

19. The computer system of claim 15, wherein at least one of the first challenge-response test or the subsequent challenge-response test is a completely automated public Turing test to tell computers and humans apart (CAPTCHA).

20. The computer system of claim 15, wherein the first test indicator is the first challenge-response test.

* * * * *